US012662755B2

(12) United States Patent

Realyvazquez Guevara et al.

(10) Patent No.: US 12,662,755 B2

(45) Date of Patent: Jun. 23, 2026

(54) SELF-CLEANING FABRIC COVERS FOR AIRCRAFT FIXTURES

(71) Applicants: Safran Seats USA LLC, Gainesville, TX (US); Safran Seats GB Limited, Cwmbran (GB); Safran Seats Tunisia, Soliman (TN); Safran Seats, Plaisir (FR)

(72) Inventors: Paula Rebeca Realyvazquez Guevara, Chihuahua (MX); Mario Gerardo Herrera Murillo, Chihuahua (MX); Benjamin Py, Bourges (FR); James Woodington, Cwmbran (GB); Ghassen Ben Amor, Nabeul (TN); Gérald Cotta, Plaisir (FR); Adrien Beauvais, Abondant (FR)

(73) Assignees: Safran Seats USA LLC, Gainesville, TX (US); Safran Seats GB Limited, Cwmbran (GB); Safran Seats Tunisia, Soliman (TN); Safran Seats, Plaisir (FR)

( * ) Notice: Subject to any disclaimer, the term of this patent is extended or adjusted under 35 U.S.C. 154(b) by 767 days.

(21) Appl. No.: 17/925,595

(22) PCT Filed: Dec. 10, 2020

(86) PCT No.: PCT/US2020/064384

§ 371 (c)(1),
(2) Date: Nov. 15, 2022

(87) PCT Pub. No.: WO2021/236158

PCT Pub. Date: Nov. 25, 2021

(65) Prior Publication Data

US 2023/0193515 A1 Jun. 22, 2023

Related U.S. Application Data

(60) Provisional application No. 63/026,571, filed on May 18, 2020.

(51) Int. Cl.
B60N 2/60 (2006.01)
B60N 2/75 (2018.01)
(Continued)

(52) U.S. Cl.
CPC ............... D01F 1/103 (2013.01); B60N 2/60 (2013.01); B60N 2/75 (2018.02); B60N 3/002 (2013.01);
(Continued)

(58) Field of Classification Search
CPC ....................................................... B60N 2/58
See application file for complete search history.

(56) References Cited

U.S. PATENT DOCUMENTS 6,655,735 B1 12/2003 Leaming
7,537,284 B1 5/2009 Antorcha
(Continued)

FOREIGN PATENT DOCUMENTS

CN 205197883 U * 5/2016
CN 209022800 U 6/2019
(Continued)

OTHER PUBLICATIONS

CN 205197883 U English Machine Translation. May 4, 2016 (Year: 2016).*
(Continued)

*Primary Examiner* — Jenna L Johnson
(74) *Attorney, Agent, or Firm* — Kilpatrick Townsend & Stockton LLP

(57) ABSTRACT

Described are self-cleaning covers for attaching to passenger seats. Embodiments of self-cleaning covers can include an antimicrobial fabric having at least one antimicrobial fiber interwoven with a second fiber, as well as an attachment element connected with the antimicrobial fabric for removably affixing the cover to the seat. The antimicrobial fabric (Continued)

and the attachment element can be shaped to partially enclose and to removably attach the self-cleaning cover to at least a portion of the passenger seat, such as a seat cushion, armrest, or headrest.

17 Claims, 6 Drawing Sheets

(51) Int. Cl.

| | |
|---|---|
| *B60N 3/00* | (2006.01) |
| *B64D 11/06* | (2006.01) |
| *C09J 7/20* | (2018.01) |
| *C09J 9/00* | (2006.01) |
| *C09J 11/04* | (2006.01) |
| *D01F 1/10* | (2006.01) |
| *D03D 15/20* | (2021.01) |
| *D03D 15/50* | (2021.01) |

(52) U.S. Cl.

CPC ........... *B64D 11/0647* (2014.12); *C09J 7/205* (2018.01); *C09J 9/00* (2013.01); *C09J 11/04* (2013.01); *D03D 15/20* (2021.01); *D03D 15/50* (2021.01); *C09J 2203/35* (2020.08); *C09J 2203/37* (2020.08); *C09J 2301/41* (2020.08); *C09J 2301/502* (2020.08)

(56) References Cited

U.S. PATENT DOCUMENTS

| | | | | |
|---|---|---|---|---|
| 9,221,372 | B1 * | 12/2015 | Lacey | .................. B60N 2/6036 |
| 9,505,327 | B1 | 11/2016 | Badie | |
| 9,643,727 | B2 | 5/2017 | Dall'Era et al. | |
| 9,756,948 | B1 | 9/2017 | Albite | |
| 9,845,034 | B1 | 12/2017 | Lew | |
| 2010/0104791 | A1 | 4/2010 | Baudrion et al. | |
| 2012/0164202 | A1 | 6/2012 | Harris et al. | |
| 2016/0107552 | A1 | 4/2016 | Wakeman | |
| 2018/0027987 | A1 * | 2/2018 | Calhoun | .................. A47C 7/62 |
| 2019/0141996 | A1 | 5/2019 | Wada et al. | |
| 2019/0261781 | A1 | 8/2019 | Hoensheid | |
| 2020/0102673 | A1 | 4/2020 | Dong et al. | |

FOREIGN PATENT DOCUMENTS

| | | | | |
|---|---|---|---|---|
| CN | 209159489 | U | * | 7/2019 |
| EP | 1979527 | A2 | | 10/2008 |
| JP | 2009520076 | A | | 5/2009 |
| KR | 200392903 | Y1 | | 8/2005 |

OTHER PUBLICATIONS

Li et al. "Role of Alginate in Antibacterial Finishing of Textiles" International Journal of Biological Macromolecules. Oct. 19, 2016 . (Year: 2016).*

English Translation of CN 209159489 XU Jul. 26, 2019 (Year: 2019).*

European Application No. 20839173.0, Office Action mailed on Aug. 22, 2024, 5 pages.

International Patent Application No. PCT/US2020/064384, International Search Report and Written Opinion, dated Mar. 16, 2021.

Lara Humberto H et al: "*Mode of Antiviral Action of Silver Nanoparticles Against HIV-1*", Journal of Nanobiotechnology, Biomed Central, vol. 8, No. 1, Jan. 20, 2010 (Jan. 20, 2010), p. 1, XP021068097, ISSN: 1477-3155.

Davoudi Zahra Mohammad et al: "*Hybrid Antibacterial Fabrics with Extremely High Aspect Ratio Ag/AgTCNQ Nanowires*", Advanced Functional Materials, vol. 24, No. 8, Oct. 1, 2013 (Oct. 1, 2013), pp. 1047-1053, XP055782273, DE ISSN: 1616-301X, DOI: 10.1002/adfm.201302368.

* cited by examiner

FIG. 7

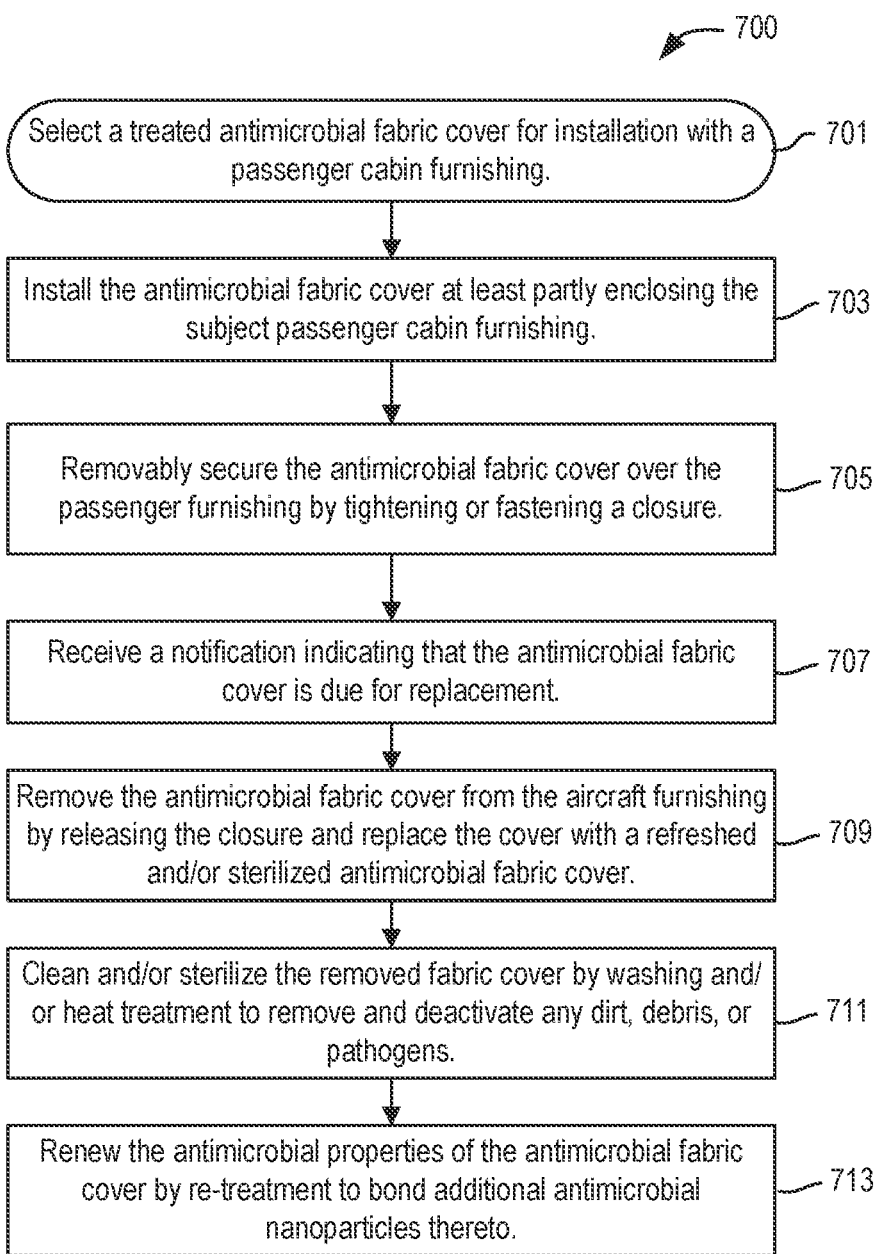

700

Select a treated antimicrobial fabric cover for installation with a passenger cabin furnishing. — 701

Install the antimicrobial fabric cover at least partly enclosing the subject passenger cabin furnishing. — 703

Removably secure the antimicrobial fabric cover over the passenger furnishing by tightening or fastening a closure. — 705

Receive a notification indicating that the antimicrobial fabric cover is due for replacement. — 707

Remove the antimicrobial fabric cover from the aircraft furnishing by releasing the closure and replace the cover with a refreshed and/or sterilized antimicrobial fabric cover. — 709

Clean and/or sterilize the removed fabric cover by washing and/or heat treatment to remove and deactivate any dirt, debris, or pathogens. — 711

Renew the antimicrobial properties of the antimicrobial fabric cover by re-treatment to bond additional antimicrobial nanoparticles thereto. — 713

1

SELF-CLEANING FABRIC COVERS FOR AIRCRAFT FIXTURES

CROSS REFERENCE TO RELATED APPLICATIONS

This application is related to and claims priority benefits from U.S. Provisional Application Ser. No. 63/026,571 ("the '571 application"), filed on May 18, 2020, entitled COVERS AND SURFACES FOR AN AIRCRAFT SEAT. The '571 application is hereby incorporated in its entirety by this reference.

FIELD OF THE INVENTION

The field of the invention relates to safety features, particularly antimicrobial features, for passenger seats.

BACKGROUND

Commercial passenger aviation is an essential part of commerce, industry, and tourism, and most importantly, brings people closer together across the world. For all of these reasons, it is difficult to avoid flying even during severe regional or global emergencies. Features like directional airflow and air filtering provide significant barriers to infectious spread in commercial aviation, however, additional safeguards are warranted in this industry, as in many other forms of transportation. In particular, there is increasing interest in preventing the transmission of communicable diseases from contaminated surfaces. The conventional approach to minimizing contact spread is aggressively cleaning high touch surfaces with virucidal or antibacterial products. However, when overused, such products can be a mild irritant, and the effectiveness of this strategy depends on the thoroughness, diligence, and frequency with which routine cleaning is carried out. To that end, additional strategies for inhibiting the transmission of communicable diseases in enclosed passenger cabins are highly desired.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seating assembly can include a passenger seat frame configured to attach to a floor of a passenger compartment, a passenger seat mounted to the passenger seat frame, and a self-cleaning or antimicrobial cover seat removably attached to the passenger seat. The antimicrobial cover can be removably attached to a portion of the passenger seat, particularly to a high-touch feature like a headrest, seat cushion, or armrest.

According to certain embodiments of the present invention, a self-cleaning or antimicrobial fabric cover can include at least a first antimicrobial fiber interwoven with a second fiber, and an attachment element configured to secure the self-cleaning cover to the passenger seat. A nonlimiting list of suitable attachment elements includes, e.g., elastic closures, a drawstring, hook-and-loop fasteners, buttons, snap fasteners, or the like. The additional fiber(s) of the antimicrobial fabric cover can include a second antimicrobial fiber having a different composition than the first antimicrobial fiber, a hydrophobic, oleophobic, or non-stick material, or any suitable combination of the above. Additional fibers beyond the first and second fibers can be interwoven or blended as a nonwoven to provide additional antimicrobial effect or additional fabric properties, e.g., hydrophobicity, oleophobicity, or a non-stick surface.

According to certain embodiments of the present invention, a method of equipping a passenger seat with an antimicrobial fabric cover can include removably enclosing at least a portion of a passenger seat with an antimicrobial fabric cover as described herein, and securing the antimicrobial fabric cover to the passenger seat via an attachment element. The antimicrobial fabric covers may be reused after washing and/or sterilization, e.g., via heat treatment, UV treatment, or comparable methods. According to some embodiments, used antimicrobial fabric covers can be refreshed between installations by retreatment to bond additional antimicrobial nanoparticles with fibers of the fabric.

BRIEF DESCRIPTION OF THE DRAWINGS

FIG. 7 is a process flow diagram illustrating an example of a process for installing an antimicrobial fabric cover.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a barrier layer made from an antimicrobial fabric over portions of seats in a commercial passenger cabin that commonly come into contact with passengers, where the fabric contains antimicrobial nanoparticles embedded or coated on the fibers that form the fabric. The fabric barrier layers are formed into fitted covers that attach to the passenger seats over portions selected to match those portions most commonly touched by passengers or most likely to cause transmission of infectious diseases. When used, the antimicrobial fabric covers are effective at deactivating viruses and/or bacteria that come into contact with the covers, thereby reducing the likelihood of the spread of any infectious disease due to surface contamination in the passenger cabin. When used in combination with cleaning best practices, distancing, and proper hygiene, these antimicrobial fabric covers further reduce the likelihood of transmission of infectious disease within the passenger cabin, or between passengers using the cabin at different times. Antimicrobial fabric covers can be routinely removed and sterilized, e.g. via heat treatment, can be replaced with fresh antimicrobial covers, or can be refreshed by retreatment as needed to maintain efficacy.

Figure 1:
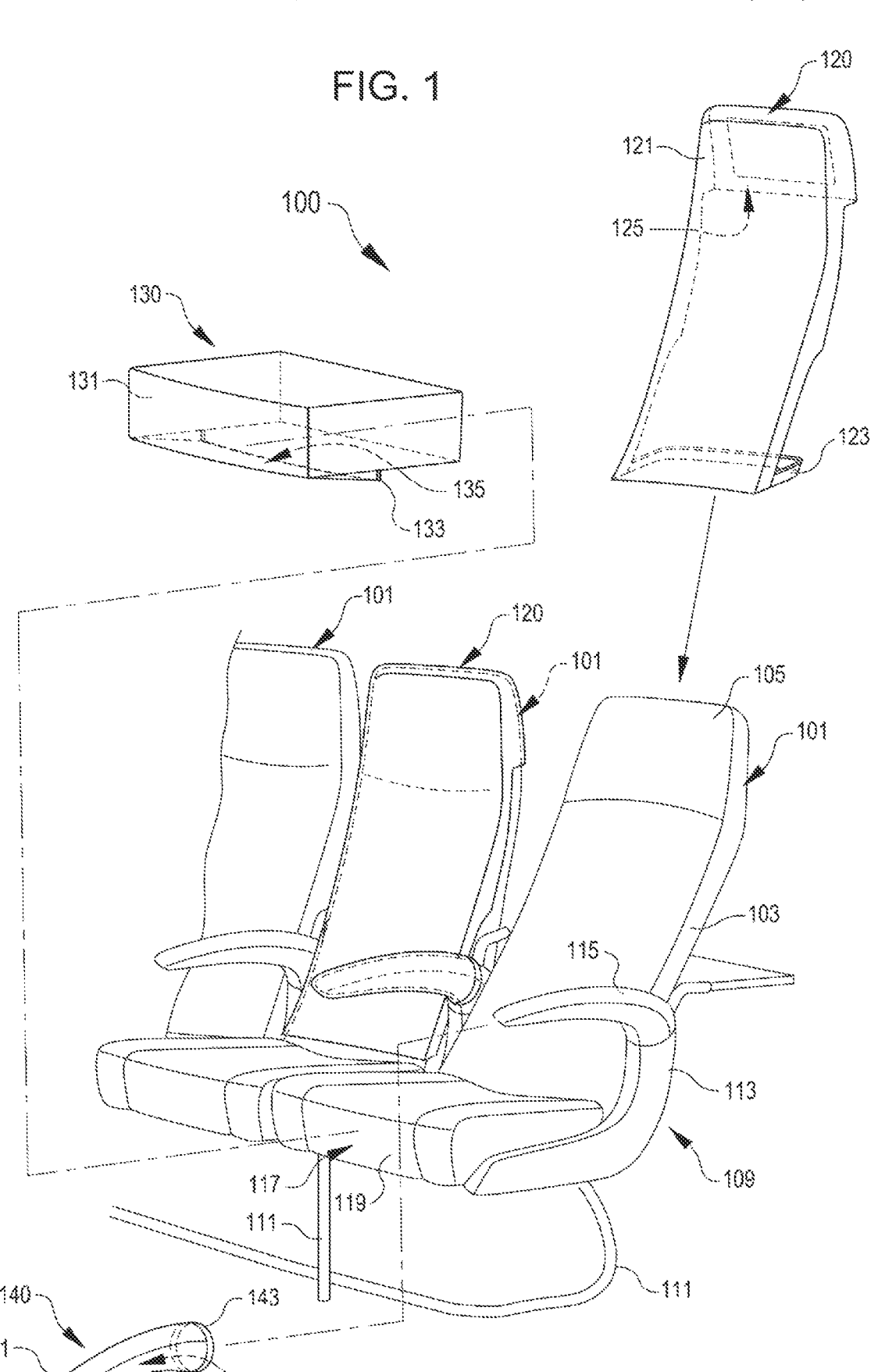
FIG. 1 is a perspective view illustrating a passenger seating arrangement in the passenger cabin incorporating various antimicrobial fabric covers installed over seat components, in accordance with various embodiments of the present disclosure.

FIG. 1 is a perspective view illustrating a passenger seating arrangement 100 in a passenger cabin incorporating various antimicrobial fabric covers installed over seat components, in accordance with various embodiments of the present disclosure. Antimicrobial fabric covers are shown attached to several different seat components in the seating arrangement 100, however it will be understood that antimicrobial covers can be attached to cover any other suitable fixture in the passenger cabin. The example passenger seating arrangement 100 includes several passenger seats 101, each passenger seat including a seat frame 109 that includes a seat bottom frame 111 supporting side frames or spreaders 113, armrests 115, a seat back 103 and a seat bottom 117. The seat back 103 includes a seat back cushion 105 for supporting a passenger, which can be formed of a leather, polymer, or textile covering that encompasses a foam cushion or supportive diaphragm. Each armrest 115 can include a leather, polymer, or textile covering at least partially encompassing the armrest. The seat bottom 117 can include a seat bottom cushion 119, which may also be formed of a leather, polymer, or textile covering that encompasses a foam cushion or supportive diaphragm.

The seat back cushion 105, seat bottom cushion 119, and armrests 115, can be encompassed by antimicrobial fabric covers as barrier layers to prevent passengers from coming directly into contact with the underlying cushion material. The antimicrobial fabric covers can trap and deactivate bacteria and/or viruses via antimicrobial nanoparticles embedded or coated on the fibers thereof. For example, according to various embodiments, the seat back 103 can be partly or fully enclosed by an antimicrobial seat back cover 120. The antimicrobial seat back cover 120 includes a textile cover body 121 formed with fibers containing antimicrobial nanoparticles, as described below. The antimicrobial seat back cover 120 can include one or more attachment features 123, e.g., straps including but not limited to hook-and-loop fasteners, elastic straps or bands, drawstrings, or other suitable attachment feature for removably attaching the antimicrobial seat back cover to the underlying passenger seat 101. The antimicrobial seat back cover 120 can further include a cutout 125 positioned and sized to permit access to elements behind the seat 101, such as tray tables, pockets, under-seat storage, and the like.

By way of a second example, the seat bottom cushion 119 can also be partly or fully enclosed by an antimicrobial seat bottom cover 130. The antimicrobial seat bottom cover 130 includes a textile cover body 131 formed with fibers containing antimicrobial nanoparticles, as described below. The antimicrobial seat bottom cover 130 can include one or more attachment features 133, e.g., straps including but not limited to hook-and-loop fasteners, elastic straps or bands, drawstrings, or other suitable attachment feature for removably attaching the antimicrobial seat bottom cover to the underlying passenger seat 101. The antimicrobial seat bottom cover 130 can further include a cutout 135 positioned and sized to provide for straightforward installation of the seat bottom cover 130 to the seat bottom cushion 119. According to some embodiments, the cutout 135 can have an elastic periphery that allows installation around the seat bottom cushion 119 without necessitating removal of the seat bottom cushion.

By way of a third example, the armrests 115 can be partly or fully enclosed by antibacterial armrest covers 140. The antimicrobial armrest covers 140 include a textile cover body 141 formed with fibers containing antimicrobial nanoparticles, as described below. The antimicrobial armrest cover 140 can further include a cutout 145 positioned and sized to provide for straightforward installation of the armrest cover 140 to the armrests 115 by sliding the cover over the armrest. According to some embodiments, the cutout 145 can have an elastic periphery or drawstring 143 that allows secure installation around the armrests 115.

Figure 2:
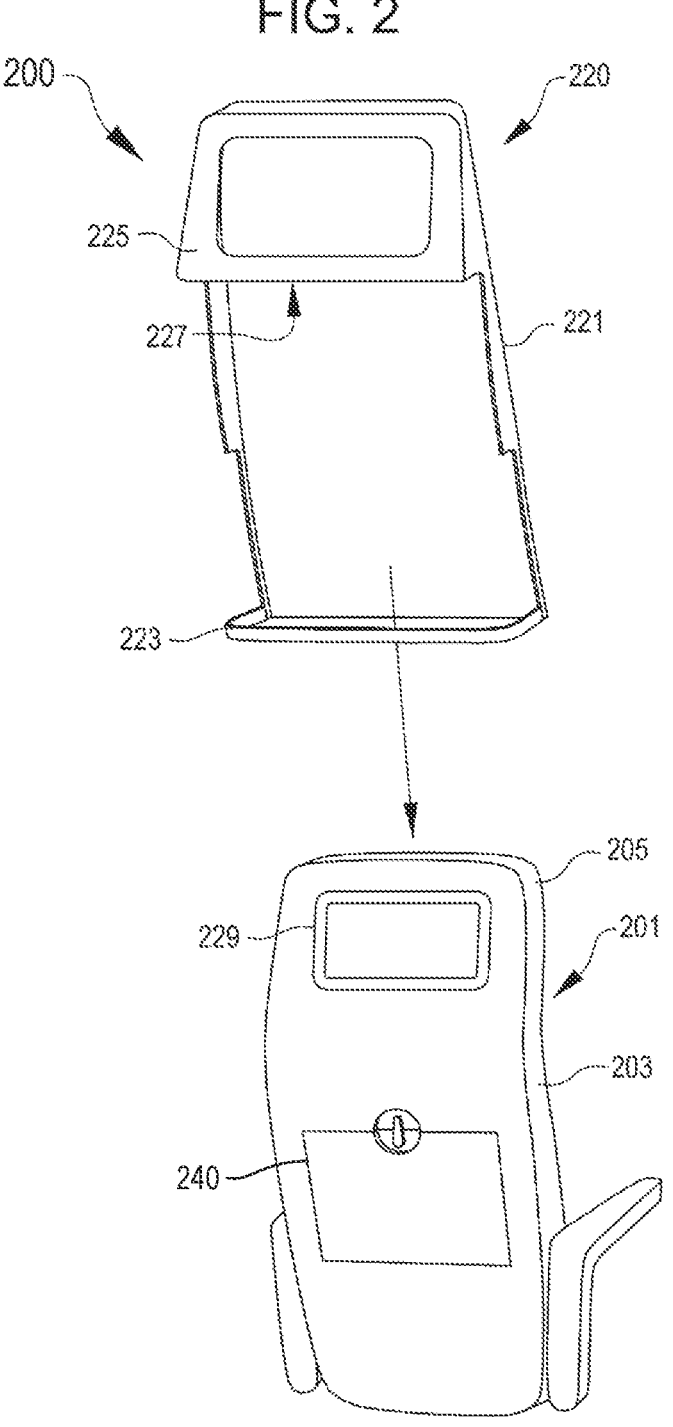
FIG. 2 is a rear perspective view illustrating the installation of a second example of an antimicrobial fabric cover over a passenger seat back.

Antimicrobial fabric covers can be configured to fit a variety of passenger seat components and passenger seat shapes, including additional cutouts to facilitate passenger access to amenities. For example, FIG. 2 is a rear perspective view of a second seating arrangement 200 illustrating the installation of a second example of an antimicrobial fabric cover 220 over a passenger seat 201, in accordance with various embodiments. The passenger seat 201 includes a passenger seat back 203 and multiple passenger amenities, e.g., a media device 229, and tray table 240. The antimicrobial seat back cover 220 includes a textile cover body 221 formed with antimicrobial fibers or fibers containing antimicrobial nanoparticles, as described below. The antimicrobial seat back cover 220 can include one or more attachment features 223, e.g., straps such as but not limited to hook-and-loop fasteners, elastic straps or bands, drawstrings, or other suitable attachment feature for removably attaching the antimicrobial seat back cover to the underlying passenger seat 201. The antimicrobial seat back cover 220 further includes an upper cutout 225 positioned and sized to permit access to the media device 229, as well as a pocket 227 for receiving at least a headrest portion 205 of the passenger seat back 203.

Figure 3:
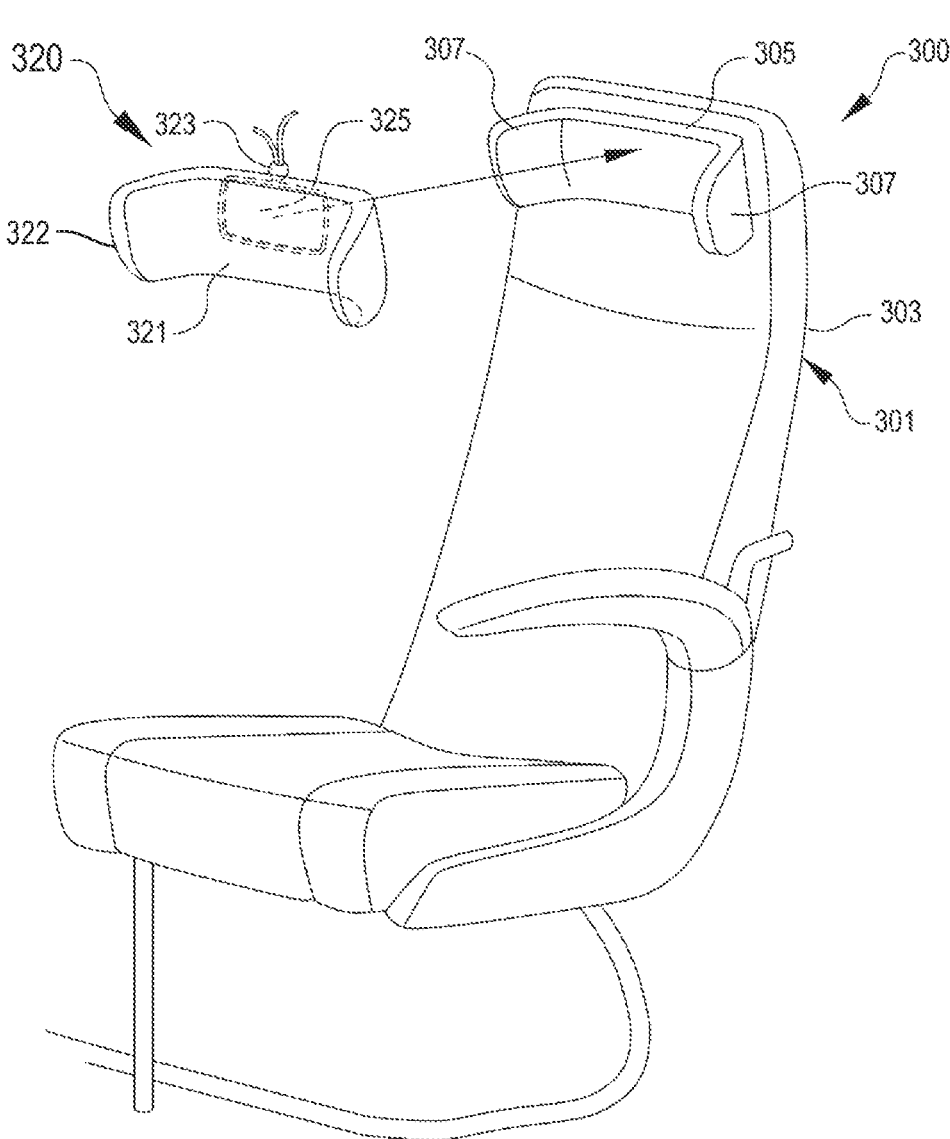
FIG. 3 is a perspective view illustrating the installation of a third example of an antimicrobial fabric cover over a passenger seat headrest.

According to various embodiments, smaller portions of the passenger seats 101, 201 may be covered with antimicrobial fabric covers that are placed to cover high touch portions of the seats, or portions that are most relevant to passenger safety. For example, FIG. 3 is a perspective view illustrating the installation of a third example of an antimicrobial fabric cover 320 over a passenger seat headrest 305. Some passenger seats, e.g. passenger seat 301 in seating arrangement 300, can include extended passenger seat headrests 305 that may protrude from an upper portion of the passenger seat back 303 and may also include partial wraparound features 307 for providing additional comfort and support to a seated passenger. An antimicrobial fabric cover 320 can be shaped and sized to cover the passenger seat headrest 305 without necessarily covering other portions of the passenger seat 301. For example, antimicrobial fabric cover 320 can include a fabric body 321 shaped to conform to the passenger seat headrest 305, (e.g. including optional wing portions 322,) and an opening 325 that can pass around the seat back headrest 305 and can be secured by a closure 323 around the opening. The closure 323 can be an elastic element, a drawstring which may or may not be elastic, or other suitable closure surrounding the opening 325.

The antimicrobial fabric covers described above (e.g. covers 120, 130, 140, 220, 320) are examples illustrating coverage of specific seat components in a passenger cabin, however, it will be understood that antimicrobial fabric covers can have specific shapes and configurations other than those shown above without departing from the spirit of the invention, in order to match with other seating configurations or specific furnishing geometries. For example, antimicrobial fabric covers can be shaped and sized to cover other types of passenger seats such as but not limited to bench seats, booth seats, or the like; or can be shaped and sized to cover furnishings other than passenger seats within a passenger cabin, such as but not limited to service carts, consoles, tables, or other structures. Any of the above-described antimicrobial fabric covers can be formed according to any suitable antimicrobial fabric construction or assembly process, embodiments of which are described below.

Figure 4:
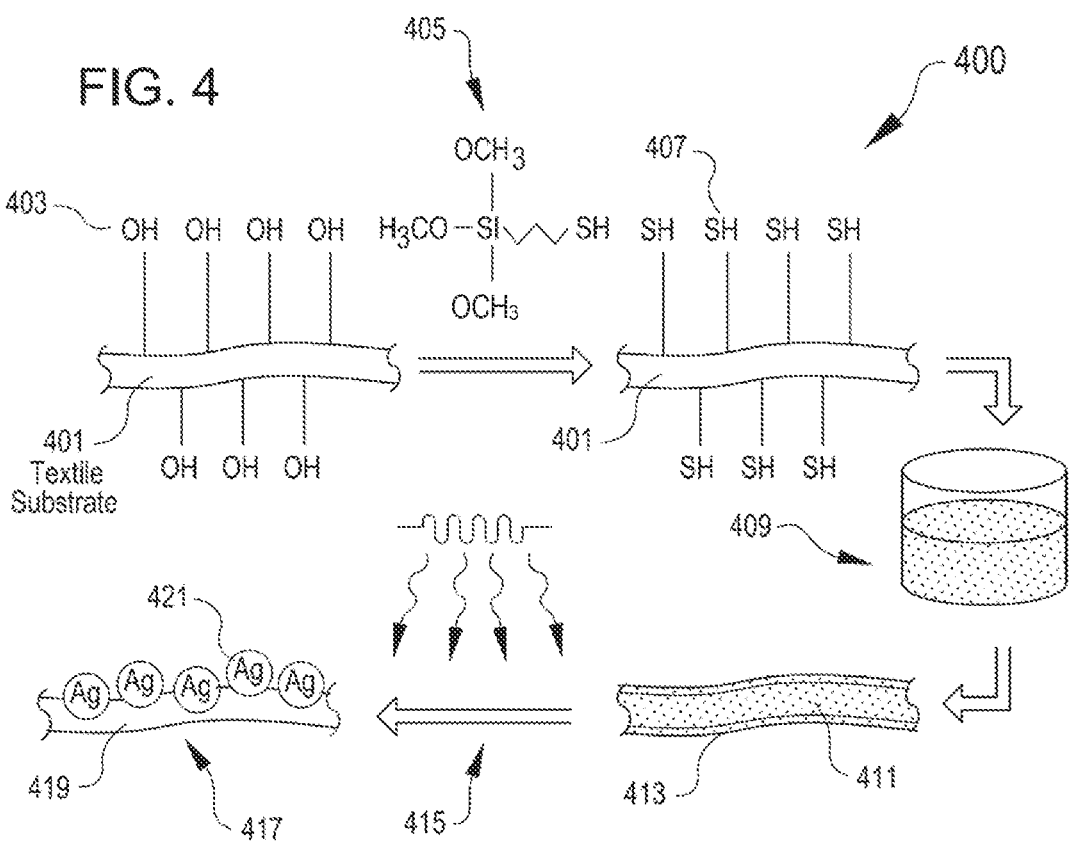
FIG. 4 is a process diagram illustrating an example process for embedding antimicrobial nanoparticles in textile fibers of an antimicrobial fabric cover.

FIG. 4 is a process diagram illustrating an example process 400 for coating antimicrobial nanoparticles on textile fibers of an antimicrobial fabric cover, in accordance with various embodiments. In the process 400, a textile substrate 401 (e.g. a textile fiber such as a cellulosic fiber (cotton, bamboo, etc.), proteinaceous fiber (wool, silk, etc.), synthetic fiber (polyester, nylon, etc.), or any suitable combination or blend thereof, which may be a spun yarn or a filament yarn,) is treated to chemically bond metal containing nanoparticles on the fiber surface. Although a silver nanoparticle process is illustrated, note that similar processes can be used to embed other antimicrobial nanoparticles than silver. In one embodiment, as shown in process 400, metallic nanoparticles are bonded to the textile substrate 401 by targeting selective replacement at hydroxyl moieties 403 on the textile substrate. In a preparation step 405, the textile substrate 401 is exposed to a thiol-functionalizing reagent (such as, but not limited to, 3-mercaptopropyltriethoxysilane, or MPTS) to form thiol functional groups 407 in place of the hydroxyl moieties 403. In a bonding step 409, the prepared textile substrate 401 is then exposed to a metallic carbamate solution (such as, but not limited to, silver carbamate) forming a metal carbamate complex solution 413 bonded with the thiol functional groups of the treated textile substrate 411. Sonication in solution can accelerate this step. The treated textile substrate 411 and metal carbamate complex solution 413 can be subjected to a thermolysis step 415, whereby exposure to heat causes metal nanoparticles 421 to bond with the heat-treated textile substrate 419, forming an antimicrobial fiber 417 with surface-bonded metal nanoparticles. According to one embodiment, the metal nanoparticles 421 are silver, however, in alternative embodiments, the metal nanoparticles can be other elemental metal nanoparticles, metal oxide nanoparticles, or other metal-containing compounds.

According to at least one embodiment, the antiviral and/or antibacterial nanoparticles 421 can be metal or metal oxide, such as but not limited to silver, copper, calcium, magnesium, or other suitable antimicrobial metallic elements, or suitable antimicrobial compounds thereof, such as but not limited to cuprous oxide, silver sulfide, silver nitrate, silver oxide, calcium oxide, magnesium oxide, or other suitable metallic compounds. According to various embodiments, two or more different antibacterial and/or antiviral elements or compounds can be present as nanoparticles or coating constituents on the textile substrate 401, or multiple fibers formed of the same or of different textile substrates may be used. Alternatively, multiple antimicrobial coatings may be applied singly to multiple textile substrates. For example, according to some embodiments, a subset of fibers in an antimicrobial fabric may have a first type of antimicrobial coating, and a different subset of fibers in the same antimicrobial fabric may have a second type of antimicrobial coating.

Figure 5:
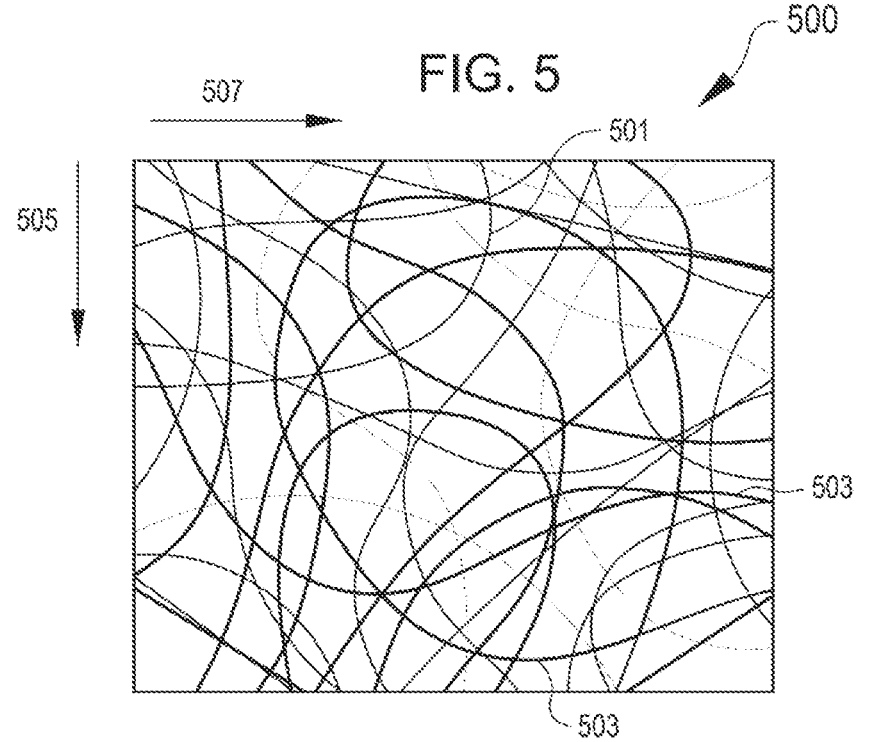
FIG. 5 is a top schematic view of an antimicrobial fabric for use in an antimicrobial fabric cover.

FIG. 5 is a top schematic view of one example of an antimicrobial fabric 500 for use in an antimicrobial fabric cover, in accordance with various embodiments. The antimicrobial fabric 500 includes at least two distinct subsets of antimicrobial fibers 501 and 503. According to one embodiment, the first subset of antimicrobial fibers 501 can be a silver coated nylon fiber, which may be coated according to any suitable process or the process 400 described above. According to another embodiment, the first subset of antimicrobial fibers 501 can be a copper coated nylon fiber, which may be coated according to any suitable process including a substitutional variant of the process 400 described above using a copper carbamate solution rather than silver carbamate. The second subset of antimicrobial fibers 503 can be a calcium alginate fiber. Calcium alginate fibers can be produced by a variety of techniques, for example, by extrusion of an alginate solution in the presence of calcium chloride. According to other embodiments, alginates other than calcium alginate may be used, such as but not limited to zinc alginate. The first and second subsets of antimicrobial fibers 501, 503 can be any other suitable combination of two or more types of antimicrobial fibers. Suitable textile constructions have been described in the context of medical textiles, e.g., by Qin, Y. (2015). *Medical Textile Materials. Germany: Elsevier Science*, at p. 150, which is hereby incorporated by reference. The antimicrobial fabric 500 is shown as a nonwoven, however, the fabric can be assembled as a woven with the first fibers 501 in a first weaving direction 505 and second fibers 503 in a second weaving direction 507, or vice versa, or with the first and second fibers alternating in one or both of the first and second weaving directions.

According to various embodiments, the antimicrobial fibers may be prepared (i.e., treated with antimicrobial metallic nanoparticles) prior to formation into a fabric by weaving, felting, or other suitable process. Alternatively, a fabric (woven or nonwoven) can be prepared with at least one untreated fiber, and subsequently treated as whole fabric by any of the processes described herein to bond the antimicrobial nanoparticles to the untreated fiber. In addition, an antimicrobial fabric may be subsequently treated one or more additional times after use in order to refresh the antimicrobial properties thereof, particularly after repeated use and washings may have partially degraded an efficacy of the antimicrobial nanoparticle coatings. In antimicrobial fabric covers, at least one fiber is antimicrobial, but additional fibers may be interwoven or blended as a nonwoven (e.g., felted) that have beneficial secondary properties other than antimicrobial properties. For example, where a first fiber is antimicrobial, a second fiber may be at least one of, or a combination of: hydrophobic, oleophobic, or non-stick. According to some embodiments, additional fibers (i.e., third or fourth fibers,) may be interwoven or blended as a nonwoven with any suitable number of antimicrobial fibers, and may have multiple properties, e.g., a hydrophobic fiber, an oleophobic fiber, a non-stick fiber, a flame-retardant fiber or coating, etc. By way of example, the additional fibers may be finished by a coating process with a hydrophobic or oleophobic polymer such as but not limited to fluoropolymer-based solids (e.g. polytetrafluoroethylene (PTFE) or its derivatives). Additional fibers may also be filaments of an oleophobic, hydrophobic, non-stick, or flame retardant material.

Figure 6:
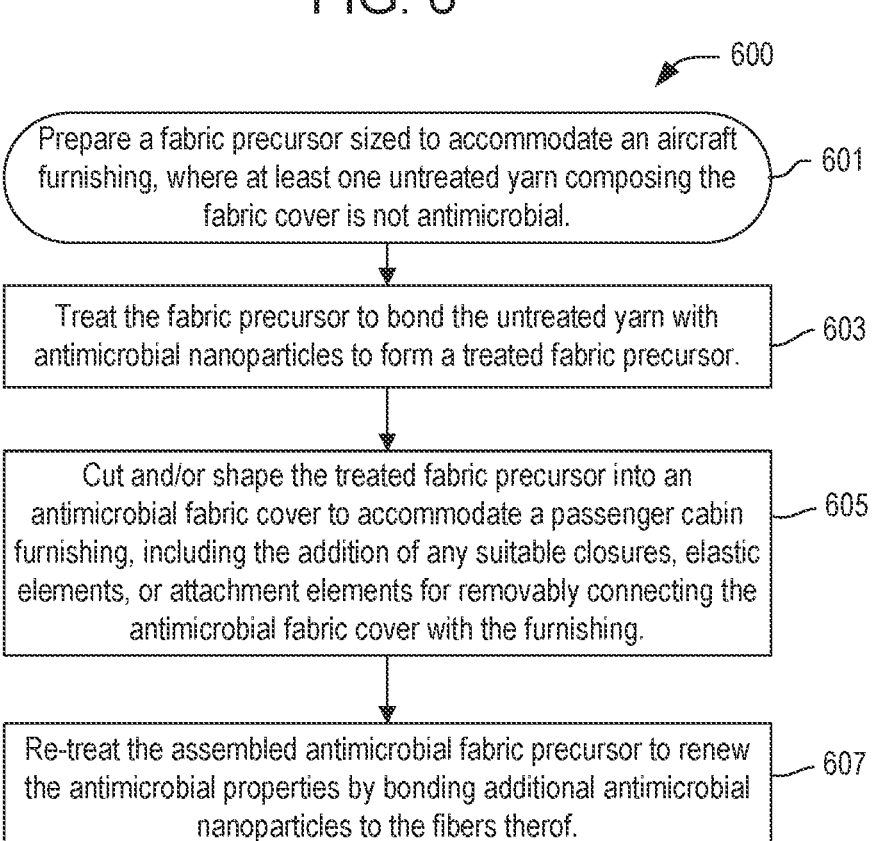
FIG. 6 is a process flow diagram illustrating a second example of a process for coating antimicrobial nanoparticles on textile fibers of an antimicrobial fabric cover.

FIG. 6 is a process for diagram illustrating a second example of a process 600 for coating antimicrobial nanoparticles on textile fibers of an antimicrobial fabric cover, in accordance with various embodiments. In the process 600, at 601, a fabric precursor can be prepared that is sized to accommodate an aircraft furnishing, where at least one untreated yarn composing the fabric cover is not antimicrobial. Subsequently, at 603, the fabric precursor as a whole can be treated to bond the untreated yarn with antimicrobial nanoparticles according to any suitable treatment process as described herein. The treated fabric precursor, at 605, can then be cut and/or shaped into an antimicrobial fabric cover to accommodate a passenger cabin furnishing, including the addition of any suitable closures, elastic elements, or attachment elements for removably connecting the antimicrobial fabric cover with the furnishing. The antimicrobial fabric cover, as fully assembled, may be treated (or retreated) by the same process any suitable number of times, at 607. Note that the assembly step at 605 and the treatment step at 603 may also be reversed—i.e., a fully assembled fabric cover can be treated to bond antimicrobial nanoparticles thereto.

FIG. 7 is a process flow diagram illustrating an example of a process 700 for installing an antimicrobial fabric cover, in accordance with various embodiments. In the process 700, at 701, a treated antimicrobial fabric cover can be selected for installation with a passenger cabin furnishing based on a geometry of the furnishing. For example, different antimicrobial fabric covers can be selected for covering different components of a passenger seat, including but not limited to: a headrest, an armrest, a seat bottom cushion, a seat back cushion, an entire passenger seat back, or the like. The selected antimicrobial fabric cover can then be installed at least partly enclosing the subject passenger cabin furnishing at 703. Once installed, a closure of the selected antimicrobial fabric cover can be attached or tightened to removably secure the antimicrobial fabric cover over the passenger furnishing at 705. According to some embodiments, antimicrobial fabric covers can be removed and replaced with new or sterilized antimicrobial fabric covers with regularity, e.g., between flights, at routine servicing at intervals between a number of flights, or after a predetermined number of uses. According to some embodiments, a relevant duration of use or number of uses can be tracked, e.g. by a coordination service, and an agent or technician may be notified of a replacement date for an antimicrobial fabric cover, at 707. Alternatively, agents or technicians can determine the replacement date based on inspection of the antimicrobial fabric covers or based on a routine schedule. When an antimicrobial fabric cover is due for replacement, an agent or technician can remove the antimicrobial fabric cover from the aircraft furnishing by releasing the closure and replace the cover with a refreshed and/or sterilized antimicrobial fabric cover at 709. According to some embodiments, used antimicrobial fabric covers can be sterilized between uses by, e.g., washing and/or heat treatment to remove and deactivate any dirt, debris, or pathogens at 711. Further, according to some embodiments, used antimicrobial fabric covers can be treated (either with each sterilization or at intervals) to renew the antimicrobial properties thereof by re-treatment of the antimicrobial fabric covers to bond additional antimicrobial nanoparticles thereto, at 713.

The processes 400, 600, 700 (or any other processes described herein, or variations, and/or combinations thereof) may be automated and performed mechanically under the control of one or more computer systems configured with executable instructions and implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, aspects of processes 400, 600, or 700 may be performed manually.

In the following, further examples are described to facilitate the understanding of the invention:

Example A. A passenger seating assembly, comprising:
a passenger seat frame configured to attach to a floor of a passenger compartment;
a passenger seat mounted to the passenger seat frame; and
a self-cleaning cover removably attached to the passenger seat, the self-cleaning cover comprising:
an antimicrobial fabric comprising at least a first antimicrobial fiber interwoven with a second fiber; and
an attachment element connected with the antimicrobial fabric configured to secure the self-cleaning cover to the passenger seat.

Example B. The passenger seating assembly of the preceding example, wherein the second fiber comprises a second antimicrobial fiber having a different composition than the first antimicrobial fiber.

Example C. The passenger seating assembly of any of the preceding examples, wherein the second fiber is not antimicrobial, and further comprising a third antimicrobial fiber interwoven with one of the first antimicrobial fiber or the second fiber.

Example D. The passenger seating assembly of any of the preceding examples, wherein the first antimicrobial fiber is a silver-coated or copper-coated nylon fiber.

Example E. The passenger seating assembly of any of the preceding examples, wherein the first antimicrobial fiber is a calcium alginate or zinc alginate fiber.

Example F. The passenger seating assembly of any of the preceding examples, wherein the first antimicrobial fiber comprises silver and/or copper and the second fiber comprises calcium alginate and/or zinc alginate.

Example G. The passenger seating assembly of any of the preceding examples, wherein the second fiber comprises one of a hydrophobic, oleophobic, or non-stick material.

Example H. The passenger seating assembly of any of the preceding examples, further comprising a seat cushion, wherein the self-cleaning cover is a seat cushion cover.

Example I. The passenger seating assembly of any of the preceding examples, wherein the self-cleaning cover is shaped to partially enclose the passenger seat.

Example J. A self-cleaning cover for attaching to a passenger seat, the self-cleaning cover comprising:
an antimicrobial fabric comprising at least a first antimicrobial fiber interwoven with a second fiber; and an attachment element connected with the antimicrobial fabric, wherein the antimicrobial fabric and the attachment element are configured to partially enclose and to removably attach the self-cleaning cover to at least a portion of the passenger seat.

Example K. The self-cleaning cover of the preceding example, wherein the antimicrobial fabric is shaped to at least partially enclose a headrest of the passenger seat.

Example L. The self-cleaning cover of any of the preceding examples, wherein the antimicrobial fabric is shaped to at least partially enclose an armrest of the passenger seat.

Example M. The self-cleaning cover of any of the preceding examples, wherein the antimicrobial fabric is shaped to at least partially enclose a cushion of the passenger seat.

Example N. The self-cleaning cover of any of the preceding examples, wherein the first antimicrobial fiber comprises a metal nanoparticle-coated or metal oxide nanoparticle-coated fiber.

Example O. The self-cleaning cover of any of the preceding examples, wherein the second fiber comprises calcium alginate fiber or zinc alginate fiber.

Example P. The self-cleaning cover of any of the preceding examples, wherein the antimicrobial fabric is formed by weaving a first fiber with the second fiber, and subsequently treating the antimicrobial fabric to coat the first fiber with antimicrobial nanoparticles to form the first antimicrobial fiber.

Example Q. The self-cleaning cover of any of the preceding examples, wherein the first antimicrobial fiber comprises a silver coated nylon fiber.

Example R. The self-cleaning cover of any of the preceding examples, wherein the self-cleaning cover is one of hydrophobic, oleophobic, or non-stick.

Example S. A method of equipping a passenger seat with an antimicrobial fabric cover, the method comprising:

removably enclosing at least a portion of a passenger seat with an antimicrobial fabric cover comprising at least a first antimicrobial fiber interwoven with a second fiber; and securing the antimicrobial fabric cover to the passenger seat via an attachment element.

Example T. The method of the preceding example, further comprising:

removing a used antimicrobial fabric cover from the passenger seat prior to the enclosing.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seating assembly, comprising:

a passenger seat frame configured to attach to a floor of a passenger compartment;

a passenger seat mounted to the passenger seat frame; and a self-cleaning cover removably attached to the passenger seat, the self-cleaning cover comprising:

an antimicrobial fabric comprising at least a first antimicrobial fiber interwoven with a second antimicrobial fiber and a third fiber, wherein the first antimicrobial fiber comprises at least one of silver or copper and the second antimicrobial fiber comprises at least one of calcium alginate or zinc alginate, and the third fiber is an oleophobic polymer; and an attachment element connected with the antimicrobial fabric configured to secure the self-cleaning cover to the passenger seat.

2. The passenger seating assembly of claim 1, wherein the first antimicrobial fiber is a silver-coated or copper-coated nylon fiber.

3. The passenger seating assembly of claim 1, wherein the second antimicrobial fiber comprises calcium alginate.

4. The passenger seating assembly of claim 1, wherein the second antimicrobial fiber comprises zinc alginate.

5. The passenger seating assembly of claim 1, wherein the antimicrobial fabric comprises one of a hydrophobic, non-stick, or flame-retardant material.

6. The passenger seating assembly of claim 1, further comprising a seat cushion connected with the passenger seat, wherein the self-cleaning cover is a seat cushion cover.

7. The passenger seating assembly of claim 1, wherein the self-cleaning cover is shaped to partially enclose the passenger seat.

8. A self-cleaning cover for attaching to a passenger seat, the self-cleaning cover comprising:

an antimicrobial fabric comprising at least a first antimicrobial fiber interwoven with a second antimicrobial fiber and a third fiber, wherein the first antimicrobial fiber comprises at least one of silver or copper, the second antimicrobial fiber comprises at least one of calcium alginate or zinc alginate, and the third fiber is an oleophobic polymer; and an attachment element connected with the antimicrobial fabric, wherein the antimicrobial fabric and the attachment element are configured to partially enclose and to removably attach the self-cleaning cover to at least a portion of the passenger seat.

9. The self-cleaning cover of claim 8, wherein the antimicrobial fabric is shaped to at least partially enclose a headrest of the passenger seat.

10. The self-cleaning cover of claim 8, wherein the antimicrobial fabric is shaped to at least partially enclose an armrest of the passenger seat.

11. The self-cleaning cover of claim 8, wherein the antimicrobial fabric is shaped to at least partially enclose a cushion of the passenger seat.

12. The self-cleaning cover of claim 8, wherein the first antimicrobial fiber comprises at least one of a silver-coated nylon fiber or a copper-coated nylon fiber.

13. The self-cleaning cover of claim 8, wherein the antimicrobial fabric is formed by weaving a first fiber with the second antimicrobial fiber, and subsequently treating the antimicrobial fabric to coat the first fiber with antimicrobial nanoparticles to form the first antimicrobial fiber.

14. The self-cleaning cover of claim 8, wherein the first antimicrobial fiber comprises a metal nanoparticle-coated or metal oxide nanoparticle-coated fiber.

15. The self-cleaning cover of claim 8, wherein the self-cleaning cover is at least one of hydrophobic, non-stick, or flame-retardant.

16. A method of equipping a passenger seat with an antimicrobial fabric cover, the method comprising:

removably enclosing at least a portion of the passenger seat with the antimicrobial fabric cover comprising at least a first antimicrobial fiber interwoven with a second antimicrobial fiber and a third fiber, wherein the first antimicrobial fiber comprises at least one of silver or copper, the second antimicrobial fiber comprises at least one of calcium alginate or zinc alginate, and the third fiber is an oleophobic polymer; and securing the antimicrobial fabric cover to the passenger seat via an attachment element.

17. The method of claim 16, further comprising:

removing a used antimicrobial fabric cover from the passenger seat prior to the enclosing.

\* \* \* \* \*